(12) United States Patent
Eick et al.

(10) Patent No.: US 8,717,846 B2
(45) Date of Patent: May 6, 2014

(54) 4D SEISMIC SIGNAL ANALYSIS

(75) Inventors: Peter M. Eick, Houston, TX (US); Joel D. Brewer, Houston, TX (US); Peter W. Cramer, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 1054 days.

(21) Appl. No.: 12/613,704

(22) Filed: Nov. 6, 2009

(65) Prior Publication Data

US 2010/0118650 A1    May 13, 2010

Related U.S. Application Data (60) Provisional application No. 61/112,810, filed on Nov. 10, 2008.

(51) Int. Cl.
*G01V 1/00* (2006.01)
(52) U.S. Cl.
USPC .......................................................... 367/38
(58) Field of Classification Search
USPC .......................................................... 367/38
See application file for complete search history.

(56) References Cited

U.S. PATENT DOCUMENTS

| 4,561,073 | A | 12/1985 | Brands et al. | |
| 6,629,037 | B1 | 9/2003 | Nyland | |
| 6,640,190 | B2 | 10/2003 | Nickel | |
| 6,906,982 | B2 | 6/2005 | Calvert | |
| 7,242,637 | B2 * | 7/2007 | Van Den Beukel et al. | 367/38 |
| 2004/0068377 | A1 * | 4/2004 | Charron | 702/14 |
| 2005/0219948 | A1 | 10/2005 | Naess | |
| 2007/0247971 | A1 | 10/2007 | Semb et al. | |
| 2008/0015783 | A1 | 1/2008 | Robertsson et al. | |
| 2008/0137476 | A1 | 6/2008 | Eick et al. | |

FOREIGN PATENT DOCUMENTS

| GB | 2437390 A | 10/2007 |
| WO | 2006054181 A1 | 5/2006 |
| WO | 2008068730 A2 | 6/2008 |

\* cited by examiner

*Primary Examiner* — Mark Hellner
(74) *Attorney, Agent, or Firm* — ConocoPhillips Company (57) ABSTRACT

Methods of seismic data collection are described that reduce the amount of data required, reduce noise in the data collected and collect more data in areas where data collection is required. This results in a dramatic reduction of datasets required and improves noise reduction in data collected. By reducing the amount of data collected and increasing the noise reduction, a more accurate seismic survey is conducted at a dramatically reduced cost.

11 Claims, 6 Drawing Sheets

4D SEISMIC SIGNAL ANALYSIS

PRIOR RELATED APPLICATIONS

This application is a non-provisional application which claims benefit under 35 USC §119(e) to U.S. Provisional Application Ser. No. 61/112,810 filed Nov. 10, 2008, entitled "4D SEISMIC SIGNAL ANALYSIS," which is incorporated herein in its entirety.

FIELD OF THE DISCLOSURE

The present disclosure generally relates to methods and processing of seismic data, particularly to processes for acquiring high quality data with fewer infill collections.

BACKGROUND OF THE DISCLOSURE

Seismic surveys image or map the subsurface of the earth by imparting acoustic energy into the ground and recording the reflected energy or "echoes" that return from the rock layers below. The source of the acoustic energy can be generated by explosions, air guns, vibrators, and the like. The energy source is positioned on or near the surface of the earth. Each time the energy source is activated it generates a seismic signal that travels into the earth, is partially reflected, and, upon its return, may be detected at many locations on the surface as a function of travel time. The sensors commonly used to detect the returning seismic energy include geophones, accelerometers, and hydrophones. The returning seismic energy is recorded as a continuous signal representing displacement, velocity, acceleration, or other recorded variation as a function of time. Multiple combinations of energy source and sensor can be subsequently combined to create a near continuous image of the subsurface that lies beneath the survey area. One or more sets of seismic signals may be assembled in the final seismic survey.

In order to develop a complete 3D or 4D seismic survey, acquisition and comparison of multiple seismic readings from a variety of sources are used to refine and enhance previous data increasing signal strength and accuracy, removing false data, background noise, and artifacts, ultimately increasing the signal to noise ratio and thus increasing the resolution of the data.

Previously, data were refined by overlaying two or more complete seismic datasets. Nickle (U.S. Pat. No. 6,640,190) describes collecting two time-lapsed sets of seismic data and generating a new data volume indicating the amounts and direction (upwards or downwards) by which the samples of the first seismic data set have to be translated in order to arrive at a representation that best resembles the second seismic data set. Calvert (U.S. Pat. No. 6,906,982) describes a method of eliminating multiple surface reflections by calculating the subsurface reflections for the original dataset. Naess (US2005219948) describes using a GPS system for 4D seismic surveys where only arrays that are most centered on the planned source point are fired where the center of the total source is positioned by GPS. Semb (US2007247971) describes repeated marine seismic surveys while adjusting the seismic source to align with the previous source. Brain, et al. (WO2006054181) uses the cross correlation between a base survey trace and new survey trace to determine if the trace(s) should be included in the 4D analysis. Robertsson, et al. (US2008015783) time lapse seismic surveys using interpolation from baseline seismic data to acquired seismic data. Aarre, et al. (GB2437390) identify displacement of a first and second seismic trace by aligning key features and using the change in position of the key features to calculate the change in position for the entire dataset.

Unfortunately, the previous methods all require the direct measurement of "substantially" the same dataset. When retrieving subsequent datasets, the source and receiver positions from one or more prior surveys are loaded into navigational packages that attempt to replicate source and receiver positions. Currently, a "feel good factor" is computed from how accurately and completely the current survey replicates the geometry of the prior survey. Due to current variations, equipment variations, ocean conditions, and the like, a high level of infill shooting is required to replicate all the prior source and receiver positions accurately. Consequently, costs and time are significantly increased for each "repeat" survey required to obtain a complete survey.

The "feel good factor" is commonly calculated in the industry from change in distance from shot point to shot point and from receiver to receiver for every trace in the composite bin. The correlation is normally considered good if the sum is less then 50 m for all traces in a composite bin. While efficient to calculate, this approach is not technically correct and requires a prohibitively expensive amount of data collection to work properly.

During a 4D seismic project, one of the most expensive aspects of seismic survey acquisition is acquiring the infill data to properly populate the survey bins with sufficient useable data to process each survey. The conventional industry standard approach is to attempt to duplicate the source and streamer positions of the original survey as closely as possible with each subsequent survey. In order to increase resolution in seismic data and reduce the time and amount of data required to infill 3D and 4D surveys, a new method of seismic data collection is needed.

BRIEF DESCRIPTION OF THE DISCLOSURE

Previously, in US20080137476 (U.S. application Ser. No. 11/677,438, Brewer & Eick), we have described systems for the acquisition and processing of seismic data using separable sources for seismic vibrators using geometrical relationships between the vibrators and positioning of the vibrators in real time.

In the acquisition of 4D seismic data, which is an attempt to duplicate a previous 3D seismic survey geometry, the final geometry, common mid points (CMP) and traces of the pre-migration processed data of the original survey are all that is needed to duplicate the seismic coverage of the original survey. This is in contrast to the conventional method of trying to match the data as acquired in the field the first time. The final CMP locations are the result of "regularizing" or decimating the original data during processing which results in a significant data reduction, leading to great time and cost savings by having to acquire less infill data to achieve a "match" to the prior survey and still be able to calculate a comparable 4D signal.

In some embodiments, the 4D seismic signal is made up of 7 basic parts: the variation of the source signature (1) and the receiver signature (2). The variation of the source to receiver location which can be subdivided into the offset (3) and the azimuth (4). The offset of the CMP to other CMPs in the bin (5) and the azimuth of the CMP in the bin (6) and finally the cross correlation of the prior 3D trace to the current matched 3D trace (7) which is made up of the environmental conditions at the time of acquisition in both surveys. These variations can be combined on a composite measure of quality via different weightings on each of the 7 basic parts. A linear summation of the weightings multiplied by the basic parts quantitatively determines an accurate measurement for bin compatibility called the SCAR. SCAR is an estimate of the "Simplified Comparative Analysis of Repeatability" that captures all of the variability between seismic surveys and allows for analysis and determination of the relative value of acquiring additional data during acquisition.

Given the 7 basic attributes to quantitatively measure SCAR bin compatibility for survey variability, the question then becomes what data is required to actually measure the variability. The industry conventional approach is to use all of the data acquired on the prior surveys and try to find the best match for every single trace in the survey. This would include all of the infill and prime lines acquired and all of the traces for each bin. The present disclosure recognizes that while acquisition acquires a large data volume, processors only migrate a very select and small subset of this data. The true measure of the variation between surveys is a comparison not of the actual field data but of the two (or more) pre-migrated data sets which have been regularized. Thus replication of the actual migrated data traces from the regularization step instead of all of the field data collected prior to migration will dramatically reduce the number of infill or repeated surveys and consequently significantly reduce the acquisition cost.

Seismic data are acquired by identifying decimated data from a seismic survey, retrieving positional information for the source, sensor, and/or CMP required to replicate the decimated data, and positioning the source, sensor, and/or CMP to record data similar to the decimated dataset.

False data are identified and reduced by identifying a surface bin grid, creating a bucket (a volumetric area defined by the surface bin grid and a unique offset plane), analyzing existing data within the bucket, generating a dataset, analyzing the dataset within the bucket, calculating changes ($\Delta$) in the source, receiver, CMP, offset, azimuth, and correlation between the dataset and existing data; measuring the false signal (N) wherein N is the sum of change in source signature ($\Delta A$), change in receiver signature ($\Delta B$), change in offset from source to receiver location ($\Delta C$), change in azimuth of source to receiver location ($\Delta D$), offset of the bucket CMP ($\Delta E$), change in azimuth of the bucket CMP ($\Delta F$), and cross correlation of the prior stacked array to the new stacked array (G). Through design, the bucket can be offset from 0 to the end of the analysis window, including offsets from 0 to 20000 m. In one example, the bucket includes bins greater than 3.125 m by 3.125 m by 3.125, from about 6.25 m by about 12.5 m and about 50 m deep, about 12.5 m by about 12.5 m and about 100 m deep, about 12.5 m by about 25 m and about 50 m deep. Bins may be about 6.25 m, about 12.5 m, about 25 m, about 50 m or about 100 m wide by about 6.25 m, about 12.5 m, about 25 m, about 50 m or about 100 m long by about 5 m, about 10 m, about 15 m, about 20 m, about 25 m, about 30 m, about 35 m, about 40 m, about 45 m, about 50 m, about 60 m, about 75 m, or about 100 m deep. Some bins have been analyzed at 100 m by 100 m by 100 m to view large subterranean features or identify areas for further refinement. In another example, representative traces are acquired in the desired unique offset planes and nominal bin size.

Seismic data are acquired by analyzing existing data in a survey area, identifying one or more areas of interest, positioning source, sensor, and/or CMP to record the area of interest, and generating a dataset in the area of interest. By repeating iteratively, resolution is dramatically increased, especially in areas of interest. One or more datasets may be replaced with a generated dataset having a lower SCAR value. In one embodiment, the source, sensor, and/or CMP are representative traces in unique offset planes. Additionally, source, sensor, and/or CMP can be optimized for one or more CMPs closest to a bin midpoint.

Decimated data can be representative traces in unique offset planes. Source, sensor and/or CMP position may be optimized for a CMP closest to a bin midpoint. In one example, data are optimized for one or more CMPs closest to a bin midpoint; optimized to minimize existing artifact, noise, variability, or the like; and optimized for existing data with the greatest signal, repeatability, or the like. By using SCAR and optimizing data collections to minimize heavily weighted SCAR factors researchers can generate data with the highest resolution (i.e. minimum SCAR correction).

BRIEF DESCRIPTION OF THE DRAWINGS

FIG. 1: A marine seismic survey covering approximately 5000×15000 ft. A) A detailed seismic analysis with multiple sweeps obtained high resolution seismic data across the entire field. B) A subsequent seismic survey obtained using reduced data collection and increased noise reduction techniques. C) The difference expressed as weighted error between surveys 1A and 1B.

FIG. 2: An arctic seismic survey covering approximated 40,000×50,000 ft. A) Prior survey of arctic area. B) Post survey sweep showing river area from center to bottom left of panel. C) Sum error plot demonstrates the river did not significantly increase error.

DETAILED DESCRIPTION OF EMBODIMENTS OF THE INVENTION

The present invention provides methods to improve seismic data collection including the dramatic reduction of datasets required and improved noise reduction. By reducing the amount of data collected and increasing the noise reduction, a more accurate seismic survey is conducted at a dramatically reduced cost.

Energy sources or "source" include seismic vibrators, explosions, airguns, and other sources known to one of ordinary skill in the art. Seismic vibrators include trucks, tractors, trailers, boats or ships, submarines, subterranean, or other sources that have a base plate that can be brought into contact with the earth or water. A reaction mass is vibrated at varying frequencies against the baseplate to produce vibratory motion which travels downward into the earth via the base plate. A survey may be designed that uses multiple energy sources, each being activated simultaneously so that the recording instruments capture a composite signal with contributions from multiple vibrators. The composite signal forms a record that may be either intentionally composite or separable through data inversion. A variety of programs are available to generate differing source patterns controlled in space, time, and frequency.

3-dimensional or 3D seismic analysis is the volumetric analysis of seismic data to generate a 3D seismic survey. 3D analysis provides innovative viewing and interpretation capabilities and supports enhanced horizon and fault interpretation allowing one to measure the size, shape, location, volume and composition of a survey area.

4-dimension or 4D seismic analysis compares two or more seismic data over varying time periods. Time periods between surveys can range from continuous to punctuated, measured from hours to decades. The time period is dependent on the survey area, activity in the area, known changes in the survey area and unknown changes in the survey area.

Common mid point (CMP) are common points on the earth either on the ocean floor or at some reference point. The defined CMP can be used to calculate those source/receiver combinations that have a common midline allowing assembly of many different source/receiver geometries into a "bin." The channels from a bin are summed together to create a "stacked" array of channels or a stacked trace. Once the data are stacked, the resulting data now contains one summed or stacked trace at each CMP location. Each geometry has a single CMP defined by the source, receiver, and CMP. This can be further complicated by changing the timing and frequency of the source energy.

Rough approximations previously used to identify the CMP include assigning a time to the nearest channel (sensor closest to the source) at the time of the shot it sensed. For marine based seismic surveys, the navigation of the ship at the time of first shot may be used as an approximate CMP location. Another approximation uses the speed of the ship and the offset of the nearest channel from the ship, to determine the length of time required for the ship to cross a point and then the channel to cross the same point. Thus the ship's location can be used to approximate the location of the source-receiver CMP location.

A more accurate computation of the CMP location additionally includes adjusting for horizontal and vertical offsets including: the ship's navigation antennae and the sound source equipment on the ship, the ship's navigation antennae and the streamer equipment on the ship, the sound source equipment on the ship and the sound source in the water, the streamer equipment on the ship and the nearest streamer channel to the ship. CMP locations can be calculated using these offset geometries, the course of the ship, and by ensuring the equipment is behind the ship (not drifting or turning).

Streamers may be flared in a "fan mode" to achieve more accurate interpolation specifications (flex specification) as described in U.S. application Ser. No. 12/167,683 (Brewer & Eick). By flaring the streamer to achieve specific geometries between the source and receiver, the number of required passes is dramatically reduced. The streamers may be flared in a fixed manner using fins on the geophones, at the termini of the streamers, at fixed points along the streamer or with various buoy configurations along the streamer. Additionally, the streamer may be positioned by remote adjustments, changes in speed, and using satellite positioning systems either directly or indirectly.

By limiting the amount of collection required to generate infill data, reducing the false data collected with each collection, and collecting data in key areas, the number of repeat surveys required is reduced and areas of interest are visualized with a higher resolution. The present invention will be better understood with reference to the following non-limiting examples.

Reduced Data Collection

Decimation, a reduction in the number of data samples, is a routine step during seismic processing to regularize the acquired data, removing extraneous data points, noise, and other artifacts. Regardless of the method of decimation, the end result is a very significant reduction of the data volume that is used for calculation and analysis of a 3D or 4D seismic survey. Because the current data and previous data are decimated, and because the previous data were analyzed using a decimated dataset, the current seismic survey and/or infill collection need only collect the data required to generate a second decimated dataset not a complete regeneration of the original dataset. By limiting the amount of data required, seismic surveying is reduced leading to a reduction in the time and cost required for a seismic survey and an increase in the precision of the accuracy of the 4D dataset.

The decimated dataset usually contains less than 75%, in some cases less than 50%, preferably less than 25%, and most preferably less than 10% of the original dataset. By reducing the required dataset from 25% to 90%, the number of repeat passes may be dramatically reduced. Analysis of the previous survey provides those CMPs required to regenerate the same bin of stacked channels. Calculating the source, CMP, and receiver required to regenerate the CMP identifies the ideal geometries required to either generate subsequent datasets or infill the current set. Thus rather than calculating CMP prior to processing and migration, CMP is calculated during acquisition and used to position sources and receivers to acquire specific data for specific bins. Ideal positions to place the source and receiver for the dataset desired are easily calculated from the CMP allowing the geometry of subsequent surveys to be defined and the desired data can be intentionally generated with a minimal number of passes. In some cases, calculating sensor/receiver position based on CMP and geometry allows accurate collection of the required data in one pass.

Removing False Data

Seismic data is plagued by noise, reflections, artifacts, and false data that obscure the desired signal. Increasing the signal to noise ratio for seismic data increases the sensitivity and repeatability of the method. The imaging method used, obscuring by false data, and geometry of the reflected data dramatically affect the quality of the seismic survey. The geometry in particular is affected by the source of the signal, the reflectance from the seismic layer, and the position of the sensor. Conventional 4D systems are obscured by false data generated by differing geometries, artifacts, and noise inherent in seismic data. By removing the false data, the true signal becomes stronger.

The SCAR is a unitless measure of the repeatability between two different seismic surveys. The method for calculating the SCAR factor involves measuring the repeatability between the two surveys and then attempting to minimize the residual SCAR value over the survey. The method establishes a surface bin grid, and then creating "buckets" defined by the surface bin grid and shape one unique offset plane deep from offset 0 to the end of the analysis window. As one example, the bucket might be defined as a bin 6.25 m by 12.5 m that is 50 m deep with an offset from 0 to 6000 m. A first or base survey, either prior data or a completed survey, is analyzed within the bucket to prepare for collection of subsequent infill data or a 4D analysis. A sequence is collected generating a second dataset. The second dataset is analyzed within the bucket creating a second 4D data volume that is defined identical to the base survey. False signals can be identified and removed from the prior datasets and any subsequent datasets, based on the weighted sum of changes (Δ) in the source, receiver, CMP, offset, azimuth, and correlation between the datasets. The following equation demonstrates the relationship between prior datasets and a current dataset.

$$\Delta A + \Delta B + \Delta C + \Delta D + \Delta E + \Delta F + \Delta G = N$$

where the false signals (N) are the sum of ΔA change in source signature, ΔB change in receiver signature, ΔC change in offset from source to receiver location, ΔD change in azimuth of source to receiver location, ΔE offset of the bucket CMP, ΔF change in azimuth of the bucket CMP, and G is the cross correlation of the prior stacked array to the new stacked array. Differences between the acquisition geometries, such as source/receiver signatures, offsets, azimuths and CMP offsets and azimuths all attribute to the noise from one survey to the next. Knowing which factors ΔA through G have the greatest effect on N allows subsequent infill data to be collected with the correct geometry to get the best data.

Identification of key factors and minimization of the false signal (N) focuses resources on those data that best fit the original bucket based on the analysis of these seven parameters. The sum of these seven parameters, calculated during the 4D survey and each having a weighting factor that is determined by the geology of the reservoir and environment at the survey, define the false 4D signal. These parameters are derived from the differences between the old and new survey parameters involving source and receiver signatures, offset and azimuth of source to receiver locations, CMP offset and azimuth, and the cross correlation of the old 3D trace match to the new 4D trace match.

After false signals are identified (N), the geology of the reservoir and the subtleness of the 4D signal, are used to develop weights for each of the factors A, B, C, D, E, F and G. For subsequent acquisitions the false 4D signal is utilized during acquisition and calculated with sequences as they are bucketed. Based upon the formula and analysis of the false signals, survey areas are identified that may require additional acquisitions to reduce the false 4D signal. Additionally geometries that avoid or reduce false 4D signals are used for subsequent surveys. This method of constantly identifying false noise with each acquisition allows identification of data where the false noise is reduced and additional scans or sequences are not required and, inversely, identifies areas where the false noise is greater and additional acquisitions are required. The mechanics of this analysis involves solving on a bucket by bucket basis the best fit of the new data to the old data that would minimize the false 4D signal based upon the weighting factors identified and refined over time if required. This volume can then be imaged and the process repeated to achieve a minimal false 4D signal.

By identifying areas that have reduced noise and don't require repeated sequences or inversely identifying those areas where a repeated data acquisition scan is required, a final noise to signal ratio is achieved that reduces artifacts and increases resolution of the final data. This method also reduces the number of scans required to achieve a high resolution survey.

Because not all of the data in a 4D survey is expected to change and existing data are available for areas that are not expected to change, a smaller sampling can be taken in areas of little or no change. In some cases no sampling is required for areas that are defined as outside the scope of interest. In other cases additional data may be collected in areas of interest and sequences designed to increase resolution based on the CMP of areas of interest. Areas of interest can include areas of active drilling, areas of seismic activity, identification and monitoring of fractures, as well as areas of increased noise or of a specific geology.

In one aspect, sampling can be used to identify areas of stability and areas of interest. By sampling a large area with few datapoints, areas that are not changed can be identified. Aligned areas can be disregarded for future infill collections and excluded from subsequent sequences. Areas of change will appear noisier or will not readily align with previous data. Subsequent sequences can then be designed to collect data in these areas. Collecting more data over a smaller area can achieve a better resolution in areas where greater resolution is required.

High Resolution with Less Data

By combining these methods of reducing the amount of data required initially, identifying false signals and increasing data collection in areas of interest, a much greater level of resolution is obtain with a minimum number of repeated sequences. Reduction in the number of sequences required can save millions of dollars for each area surveyed.

Example 1

Marine Seismic Surveys

Figure 1A:
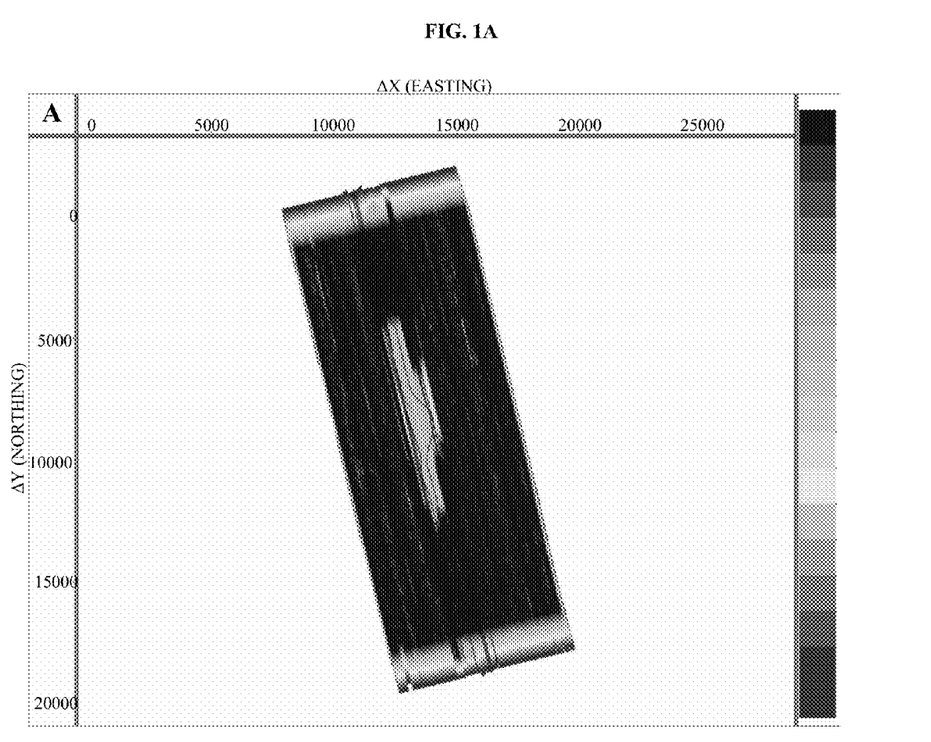
Figure 1B:
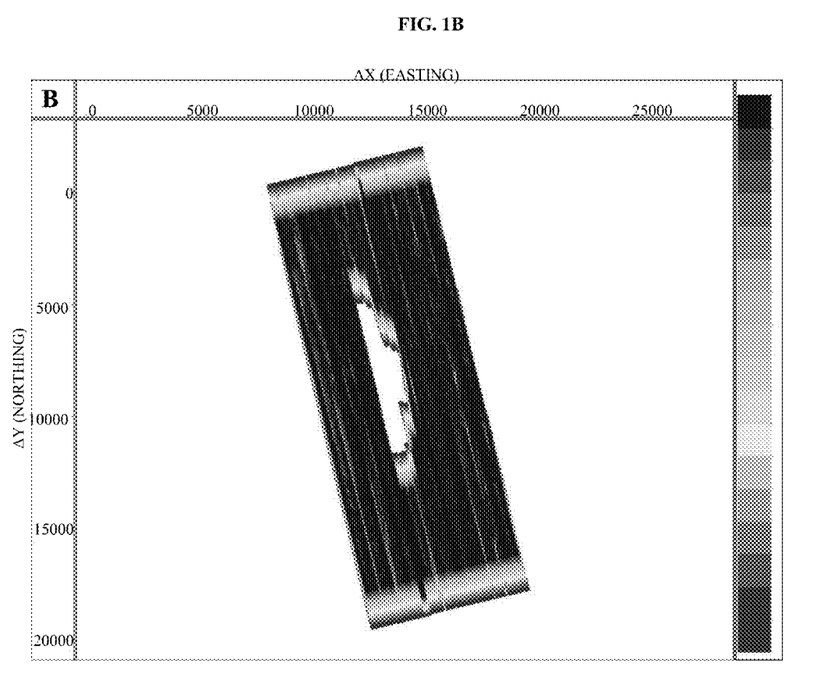
Figure 1C:
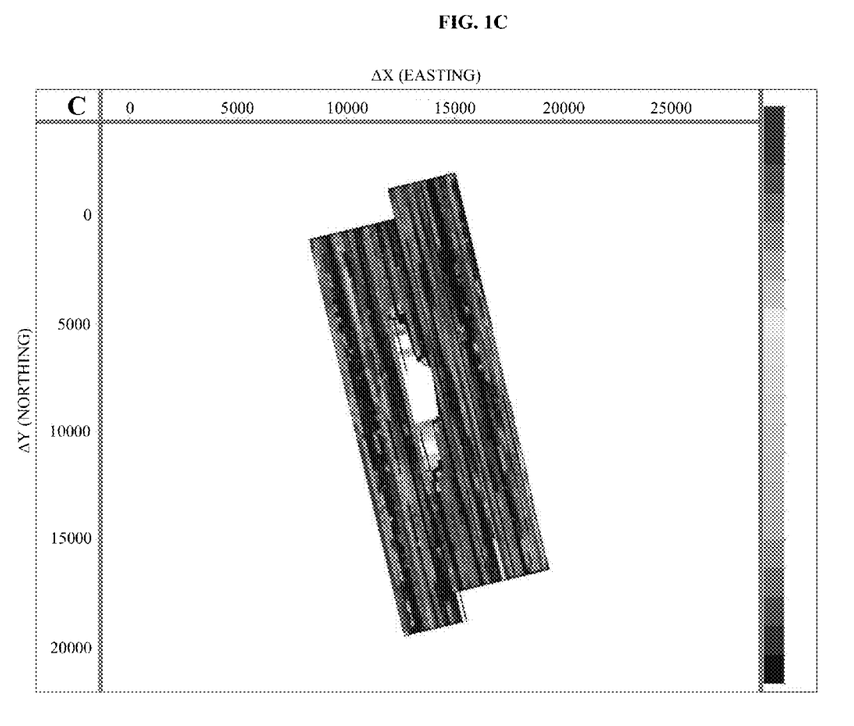

Time and cost can be prohibitive when conducting marine seismic surveys. For the present example, a primary survey was conducted as a baseline. In anticipation of a variety of future seismic surveys, a very detailed seismic survey was conducted to the maximum resolution available with the equipment and expense available at the time of survey (FIG. 1A). At a later date, a post marine survey was conducted (FIG. 1B). Visible in FIG. 1B are stripes of data that were not filled in to the original resolution. Using the baseline survey and calculating those areas where little or no change had occurred, areas were either not collected or not in-filled if they were not required. Each empty stripe is a boat pass that was not required to obtain an image of the area of interest. The final plot or the difference is the weighted error between the surveys (FIG. 1C)—a visual display of the error factor. The rest of the infill was not necessary as shown by the position and amount of error. Thus, based upon the required resolution in the image and collected field data, the 4D effect was accurately mapped with fewer sweeps.

Example 2

Arctic Seismic Surveys

Figure 2A:
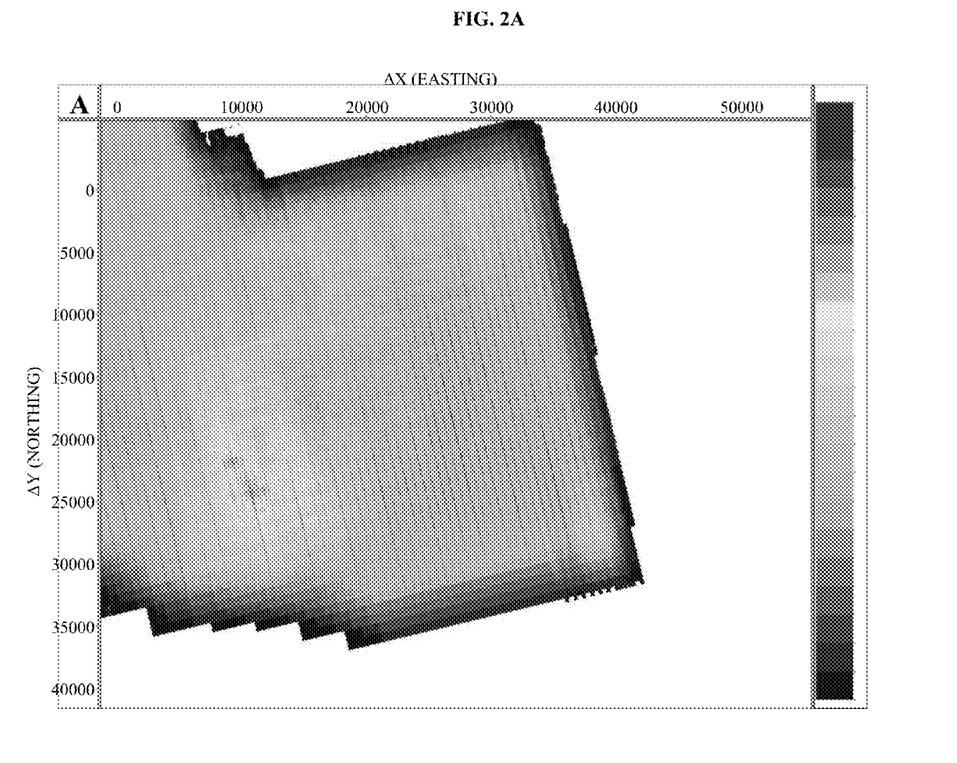
Figure 2B:
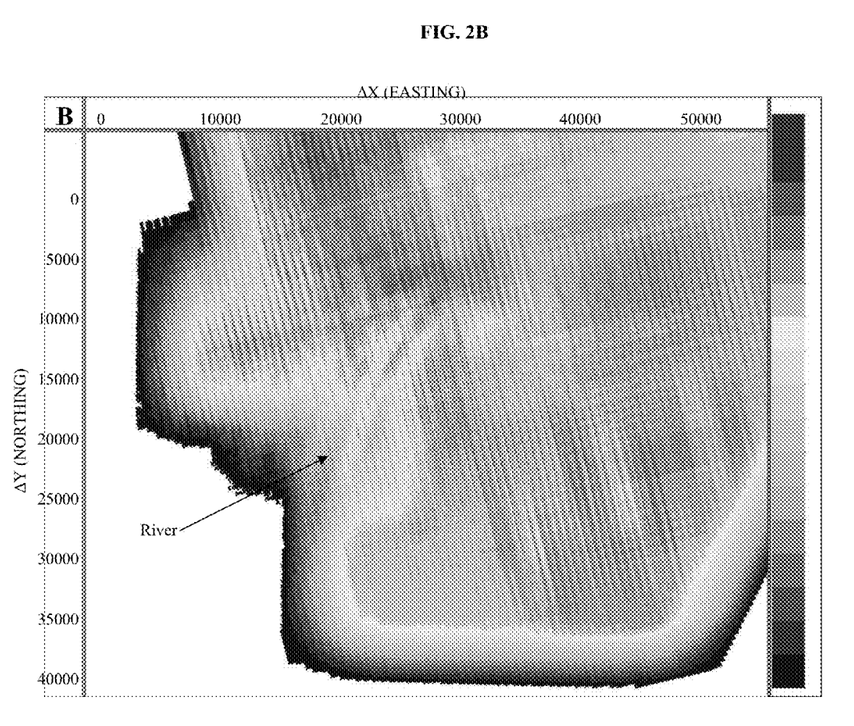
Figure 2C:
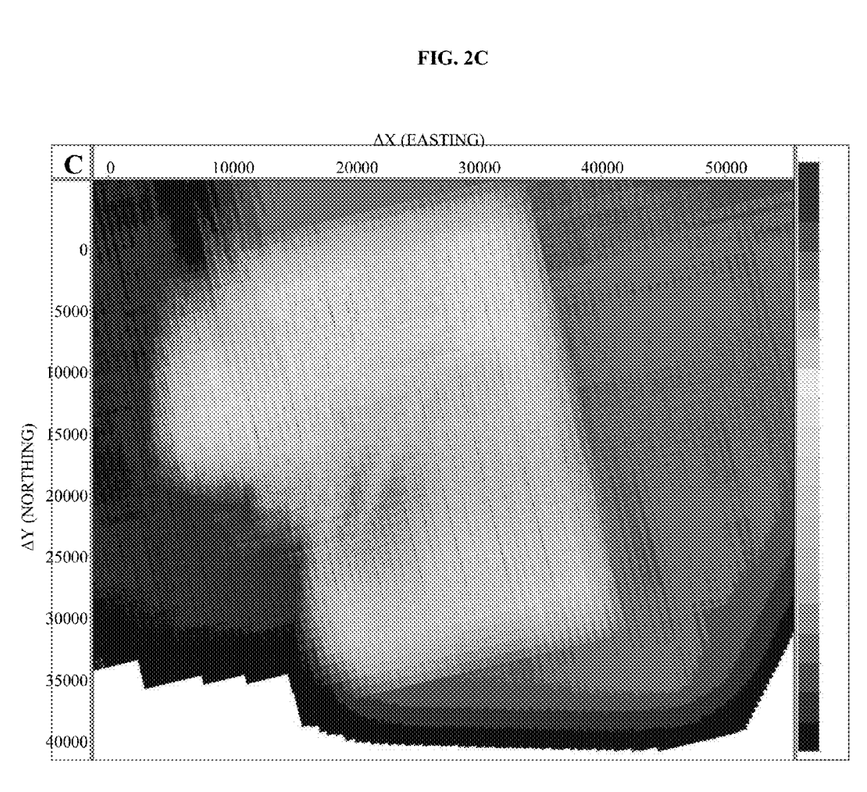

When surveying ecologically sensitive areas or in areas with geographical features that interfere with seismic surveys, additional precautions are required. In this example, a ecologically sensitive river is present in the survey area. SCAR factors were used to determine if a survey was required in the sensitive river area. A prior survey (FIG. 2A) and a second shooting on the survey (FIG. 2B) did not allow visualization of the river area. The river area extends from the center to southwest (bottom left) of FIG. 2. Analysis of the sum error plot shows that the river did not affect the final resolution of the image. Additional surveys were not required because the image quality after the second shoot was sufficient to obtain an image of the survey area.

Visualization of the reservoir allows generation of a 2-dimensional, 3-dimensional and/or a 4-dimensional model or map of the subsurface structures. These visualizations may be presented using a computer and monitor, 3-dimensional displays including 3-D glasses, and/or paper maps and physical models. Maps and models provide a direct visualization of the subsurface structures as generated through seismic methods described herein using programs, programmable media, and hardware sufficient to process the data. Although the systems and processes described herein have been described in detail, it should be understood that various changes, substitutions, and alterations can be made without departing from the spirit and scope of the invention as defined by the following claims.

REFERENCES

All of the references cited herein are expressly incorporated by reference. Incorporated references are listed here for convenience:

1. U.S. Ser. No. 11/855,776 filed Sep. 14, 2007, Olson, et al., "Method and Apparatus for Pre-Inversion Noise Attenuation of Seismic Data."
2. U.S. Ser. No. 11/933,522 filed Nov. 1, 2007, Chiu, et al., "Method and Apparatus for Minimizing Interference Between Seismic Systems."
3. U.S. Ser. No. 12/167,683 filed Jul. 3, 2008, Brewer, et al., "Marine Seismic Acquisition with Controlled Streamer Flaring."
4. U.S. Ser. No. 61/109,279 filed Oct. 29, 2008, Eick, et al., "Variable Timing ZENSEIS™."
5. U.S. Ser. No. 61/109,329 filed Oct. 29, 2008, Chiu, et al., "Simultaneous Multiple Source Extended Inversion."
6. U.S. Ser. No. 61/109,403 filed Oct. 29, 2008, Eick, et al., "Marine Seismic Acquisition."
7. U.S. Ser. No. 61/112,810 filed Nov. 10, 2008, Brewer, et al., "4D Seismic Signal Analysis."
8. U.S. Ser. No. 61/112,875 filed Nov. 10, 2008, Eick and Brewer, "Practical Autonomous Seismic Recorder Implementation and Use."
9. U.S. Ser. No. 61/121,976 filed Dec. 12, 2008, Cramer et al., "Controlled Source Fracture Monitoring."
10. U.S. Pat. No. 6,640,190 "Estimating Subsurface Subsidence and Compaction." Nickel, Schlumberger Tech. Corp. (2002).
11. U.S. Pat. No. 6,906,982 "Marine Time-Lapse Seismic Surveying" Calvert, Shell Oil Co. (2003).
12. US2005219948 "Apparatus and Method for Carrying out Seismic Surveys" Naess, Statoil (2005).
13. US2007247971 "Four Dimensional Seismic Survey System and Method" Semb and Karlsen (2007).
14. US2008015783 "Time Lapse Marine Seismic Surveying Employing Interpolated Multicomponent Streamer Pressure Data" Robertsson, et al., WesternGeco L.L.C. (2008).
15. US2008137476, "Dynamic Source Parameter Selection for Seismic Vibrator Data Acquisition," Eick, et al., ConocoPhillips Co., (2008).
16. WO2006054181, "Method for Processing at Least Two Sets of Seismic Data" Brain, et al., Compagnie Generale De Geophysique, (2006).
17. WO2008068730, "Dynamic Source Parameter Selection for Seismic Vibrator Data Acquisition," Eick, et al., ConocoPhillips Co., (2008).
18. GB2437390 "Calculating a Displacement Field Particularly for Use in Time-Lapse Seismic Surveying" Aarre and Midtun, WesternGeco Seismic Holdings Ltd. (2007).

We claim:

1. A method of acquiring seismic data comprising:
   a) identifying decimated data from a seismic survey;
   b) retrieving positional information for the source, sensor, CMP or combinations thereof required to replicate the decimated data (a); and
   c) positioning the source, sensor, CMP or combinations thereof to record data substantially similar to the decimated dataset (a).

2. The method of claim 1, wherein said decimated data are representative traces in unique offset planes.

3. The method of claim 1, wherein the source, sensor or CMP position (c) is optimized for a CMP closest to a bin midpoint.

4. The method of claim 1, wherein the source, sensor or CMP position (c) is optimized for traces with the least artifact, noise, variability, or the like.

5. The method of claim 1, wherein the source, sensor or CMP position (c) is optimized for traces with the greatest signal, repeatability, or the like.

6. The method of claim 1, wherein the source, sensor or CMP position (c) is optimized for traces with a SCAR factor with minimum correction.

7. A method of acquiring seismic data comprising:
   a) analyzing existing data in a survey area;
   b) identifying one or more areas of interest;
   c) positioning a source, sensor, CMP or combinations thereof to record data substantially similar to the area of interest;
   d) generating a dataset.

8. The method of claim 7, wherein said steps (a)-(d) are repeated iteratively to increase resolution in areas of interest.

9. The method of claim 7, wherein one or more datasets are replaced with a generated dataset having a lower SCAR value.

10. The method of claim 7, wherein said source, sensor, or CMP (c) are representative traces in unique offset planes.

11. The method of claim 7, wherein said source, sensor, or CMP (c) are optimized for one or more CMPs closest to a bin midpoint.

* * * * *